United States Patent
Kempter et al.

(10) Patent No.: US 9,987,690 B2
(45) Date of Patent: Jun. 5, 2018

(54) SEGMENT COLLET

(71) Applicant: Roehm GmbH, Sontheim/Brenz (DE)

(72) Inventors: Stefan Kempter, Landensberg (DE); Andreas Dolpp, Nattheim (DE)

(73) Assignee: Roehm GmbH, Sontheim/Brenz (DE)

( * ) Notice: Subject to any disclaimer, the term of this patent is extended or adjusted under 35 U.S.C. 154(b) by 66 days.

(21) Appl. No.: 15/139,665

(22) Filed: Apr. 27, 2016

(65) Prior Publication Data

US 2016/0311033 A1    Oct. 27, 2016

(30) Foreign Application Priority Data

Apr. 27, 2015  (DE) .................. 10 2015 106 437

(51) Int. Cl.
  *B23B 31/20*  (2006.01)
  *B23B 31/26*  (2006.01)
  *B23B 29/04*  (2006.01)

(52) U.S. Cl.
  CPC .......... *B23B 31/265* (2013.01); *B23B 29/046* (2013.01); *B23B 2226/33* (2013.01)

(58) Field of Classification Search
  CPC . B23B 31/265; B23B 29/046; B23B 2226/33; B23B 2231/2086; B23B 31/202; B23B 2231/2089; B23B 2231/2078; B23B 31/20; B23B 2231/2002
  See application file for complete search history.

(56) References Cited

U.S. PATENT DOCUMENTS

| | | | | |
|---|---|---|---|---|
| 2,459,900 A | * | 1/1949 | Stoner | B23B 31/202 279/46.7 |
| 2,817,535 A | * | 12/1957 | Linzell | B23B 31/202 279/55 |
| 2,835,496 A | * | 5/1958 | Hall | B23B 31/202 279/46.7 |
| 2,880,007 A | * | 3/1959 | Stoner | B23B 31/201 279/46.7 |
| 5,644,945 A | * | 7/1997 | Baldwin | B21D 39/046 29/237 |
| 6,568,889 B2 | | 5/2003 | Roehm | |
| 6,966,561 B2 | | 11/2005 | Weller | |

FOREIGN PATENT DOCUMENTS

| | | |
|---|---|---|
| DE | 100 59 209 A1 | 6/2002 |
| DE | 101 38 330 A1 | 2/2003 |
| DE | 10 2006 011 047 A1 | 9/2007 |
| DE | 20 2012 100 886 U1 | 6/2012 |

* cited by examiner

*Primary Examiner* — Daniel Howell
*Assistant Examiner* — Paul M Janeski
(74) *Attorney, Agent, or Firm* — Muncy, Geissler, Olds & Lowe, P.C.

(57) ABSTRACT

A segment collet, which includes at least two clamping segments, each of which has a receptacle, in which a coupling ring is accommodated, which connects the clamping segments to each other. A securing device is provided to connect the coupling ring to the clamping segments for the purpose of limiting the axial mobility of the clamping segments relative to the coupling ring as well as to fix their circumferential position. The invention furthermore relates to a coupling ring for a segment collet.

20 Claims, 14 Drawing Sheets

SEGMENT COLLET

This nonprovisional application claims priority under 35 U.S.C. § 119(a) to German Patent Application No. 10 2015 106 437.5, which was filed in Germany on Apr. 27, 2015, and which is herein incorporated by reference.

BACKGROUND OF THE INVENTION

Field of the Invention

The invention relates to a segment collet, which includes at least two clamping segments, each of which has a receptacle, in which a coupling ring is accommodated, which connects the clamping segments to each other. The invention furthermore relates to a coupling ring for a segment collet.

Description of the Background Art

A segment collet of the type mentioned at the outset is illustrated, for example, in DE 100 59 209 A1 of the applicant, which corresponds to U.S. Pat. No. 6,568,889, and which is incorporated herein by reference. The coupling ring is designed as a vulcanized ring. In the manufacture of this segment collet, the individual clamping segments must first be cleaned. A bonding layer, i.e., a primer, is then applied to the surfaces of the clamping segments, to which the vulcanized material may adhere. The clamping segments are then disposed true to position in a mold, so that they may assume their desired position, distributed over the circumference of the coupling ring, after the vulcanization process. The vulcanized material is applied to the clamping segments inserted into the mold under pressure and the application of heat, for the purpose of assembling the clamping segments into a segment collet.

In the conventional art, the manufacturing method of a segment collet has proven to be extremely complex, cost-intensive and, to a certain extent, susceptible to errors, due to the many manufacturing steps.

SUMMARY OF THE INVENTION

It is therefore an object of the present invention to provide a segment collet in such a way that the manufacture is simplified. The object of the present invention is furthermore to provide a coupling ring, which is more favorable in its manufacture than the conventional art.

The object relating to the segment collet is achieved in an exemplary embodiment by a segment collet of the type mentioned at the outset in that, to connect the coupling ring to the clamping segments, a securing device is provided for limiting the axial mobility as well as to fix the position of the clamping segments relative to the coupling ring on the circumference, preferably in a form-fitting manner. This ensures that the coupling ring is much more cost-effective to manufacture, compared to a previously vulcanized coupling ring. Moreover, the clamping segments also no longer have to be inserted into a predetermined mold, since they are now fixed in their position relative to the coupling ring by the securing device. In addition, the undesirable separation of the coupling ring from the clamping segments, or the undesirable separation of individual clamping segments from the coupling ring, is prevented in the axial direction by the securing device.

The receptacles can be formed on the end faces of the clamping segments, and the securing device can be assigned to the receptacles. Due to the formation of the receptacles on the end face of the clamping segments, a thin diameter of the segment collet may be maintained. The diameter and the clamping contour are preferably provided with an identical shape to that of existing segment collets.

The coupling ring can be formed from securing sections accommodated in the receptacles and from web sections connecting the securing sections to each other. Due to the position of the securing sections of the coupling ring, the position of the clamping segments is predetermined on the circumference of the coupling ring.

An embodiment provides that the securing device can be formed from a recess, which is assigned to one receptacle and coupling ring, and from a securing element, which is assigned to another receptacle and coupling ring. The securing elements are accommodated in the recess and implement the coupling between the coupling ring and the clamping segments. The securing element is disposed on the receptacle of the clamping segments when the recess is provided on the coupling ring. Conversely, the securing element is disposed on the coupling ring when the recess is disposed in the receptacle of the clamping segments.

The manufacture of the securing device is simplified by the fact that the recess designed as a latching receptacle is oriented radially, and the securing element, also disposed in the radial direction and designed as a latching element, engages with the latching receptacle. The recess may be introduced either radially on the inside or radially on the outside.

In this connection, it has proven to be advantageous if the latching elements are assigned to the coupling ring and supported on the securing sections in a radially elastically deformable manner. The radially elastically deformable latching element on the securing section of the coupling ring may thus engage with a recess formed in the receptacle of the particular clamping segment. In one alternative embodiment, the latching element of the coupling ring may also be released from the recess of the receptacle when a predetermined force is exceeded. This makes it possible to replace individual defective or faulty clamping segments as well as to exchange the entire coupling ring. This provides a significant advantage over the known segment collet, which is designed with a vulcanized coupling ring, since in this segment collet, the complete segment collet must always be replaced; exchanging individual clamping segments or the coupling ring is not possible.

An embodiment provides that the recesses can be formed on the receptacles of the clamping segments in the axial direction, and the securing elements are disposed on the securing sections of the coupling ring. This is associated with the advantage that the recess may be produced in the receptacle by a simple bore, which is preferably also located on the end face of the clamping segments. A securing element provided on the coupling ring may then be introduced into this recess, so that the axial mobility of the coupling ring is limited by the clamping segments, and the clamping segments are also fixed in their position on the circumference of the coupling ring.

To establish a force-fitting connection between the recesses and the securing elements, it has proven to be preferable if the recesses are designed with a smaller diameter than the diameter of the securing elements.

In this context, it has proven to be useful if at least one, preferably all, of the recesses have a roughened surface and/or a thread cut, and if the securing elements of the coupling ring are pressed into the recesses. This approach anchors the securing elements of the coupling ring even more firmly into the recesses of the receptacles of the clamping elements.

According to an embodiment, it has furthermore proven to be advantageous if the securing elements are assigned to the receptacles of the clamping segments, if the securing elements are designed as securing pins which are pressed into pockets formed in the receptacles of the clamping segments, and if the recesses, which are designed as openings with play for the securing pins, are formed on the securing sections of the coupling ring. The coupling ring thus has openings or passages, through which a securing pin may pass, which preferably forms a clearance fit with the opening. Thus, no deformation or no widening of the openings in the coupling ring occurs, due to the securing pins. The securing pins have a diameter which is bigger than the diameter of the pockets formed in the receptacles of the clamping segments. As a result, the securing pin may be pressed into these pockets. The securing pin is preferably designed as a countersunk grooved pin. Alternatively, the securing pin may include a screw section which may be screwed into the pocket. The securing pin may furthermore be designed as a rivet. With regard to the selection of material for the securing pin, both steel and plastic have proven to be preferable, it also being possible to produce the securing pin from a hard elastomer. The pin limits the axial mobility of the coupling ring with respect to the clamping segments, for which purpose it has a correspondingly shaped pin head.

To be able to apply a restoring force to the clamping segments, it has proven to be preferable if the web sections have a wave-shaped, preferably a sine wave-shaped, design. If the coupling ring is expanded, the wave-shaped web sections press the coupling ring back into its original position and apply a restoring force to the receptacles, i.e., to the clamping segments. The segment collet is thus pressed into an open position thereby.

It has furthermore proven to be useful if the web sections have at least one contact wall, preferably at each of its ends, for the purpose of contact with a flank of the clamping segments. The flank of the clamping segments abuts this contact wall in such a way that a circumferentially smooth surface for the segment collet arises.

In this context, it has proven to be advantageous if the clamping segments are each supported on the coupling ring in a form-fitting manner by the contact walls of two adjacent web sections. This also ensures that the circumferential position of the clamping segments is additionally fixed relative to the coupling ring. In this context, it has furthermore proven to be preferable if the web sections apply an, at least slight, pretension to the clamping segments, so that the clamping segments are supported even more firmly on the coupling ring.

A strengthened connection between the coupling ring and the clamping elements is furthermore established by the fact that the securing sections are additionally integrally secured in the receptacles of the clamping segments. For this purpose, a bonding layer (primer) is introduced into the receptacles, whereby an adhesive adheres better to the clamping segments, which, in turn, integrally secures the coupling ring in the receptacles of the clamping segments.

Securing sections disposed in alternating order and the web sections connecting the securing sections to each other are also provided. A securing element can be assigned to the securing sections for the purpose of limiting the axial mobility as well as to fix the position of clamping sections on the coupling ring on the circumference of the ring, preferably in a form-fitting manner. This coupling ring thus has the advantage that clamping segments are disposable thereon without requiring a complex measurement for determining the position of the clamping segments on this ring. Clamping segments are furthermore securable on the coupling ring, in the axial direction in relation thereto, in the area of the latter's securing sections.

For the purpose of manufacturing, it has proven to be particularly useful if the web sections and/or the securing sections are made from an elastomer or from a plastic. For this purpose, generative manufacturing methods have proven to be particularly preferred, so that a coupling ring according to the invention may be manufactured by means of selective laser sintering of elastomers or plastics. When manufacturing the coupling ring in very large quantities, it has proven to be economically advantageous if the coupling ring is manufactured in an injection-molding process.

It has proven to be useful, for example, if the area of the cross section of the securing section is smaller than the area of the web section. A clamping segment inserted into the coupling ring may thus form a smooth surface with the web sections of the coupling ring on the circumference.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A segment collet according to the invention, which includes at least two clamping segments 1, is illustrated in FIGS. 1, 10, 15, 17 and 22. The segment collet is used for the detachable coupling of a workpiece, tool or the like, which has a hollow shank with a hollow shank receptacle. In the segment collet according to the invention, any arbitrary even or odd number of clamping segments 1 may be used, in principle, specific embodiments having six or seven clamping segments 1 having been proven to be favorable.

Clamping segments 1 illustrated in the exemplary embodiments are formed from a segment body 23, on whose first end a segment head 21 is disposed and on whose second end opposite the first end a segment foot 22 is disposed. Segment heads 21 have bevels 29 on their radially outer side, which are inclined toward the longitudinal axis and which may be brought into contact with inclined clamping bevels formed in a hollow shank receptacle. Clamping segments 1 are supported in an annular groove running in the circumferential direction in a working spindle and essentially extend in the axial direction, in parallel to the longitudinal axis of a corresponding clamping device, clamping segments 1 engaging with the annular groove by their segment foot 22, and segment head 21, on which bevel 29 is provided, being formed on the opposite free end.

A corresponding clamping device is described in greater detail in DE 100 59 209 A1, reference being hereby made, in particular, to Column 3, Lines 17 through 25 thereof. To adjust clamping segments 1 and thus to actuate the clamping device—which is not illustrated in greater detail—an axially movable clamping head is guided in the working spindle, which has a conical surface which interacts with contact surface 31 of segment head 21 for the purpose of forming a wedge gear therewith, as well as a control surface, which interacts with segment foot 22 for the purpose of releasing the tension. The clamping head furthermore includes an annular band having an axially constant diameter, which interacts with a bulge 24 formed on segment foot 22.

In the invention, each of clamping segments 1 has a receptacle 2, in which a coupling ring 3 is accommodated, which connects clamping segments 1 to each other. It is apparent from the figures that receptacles 2 are formed in segment foot 22 of clamping segments 1. As is furthermore apparent, receptacles 2 are formed on the end face of the clamping segments 1 on their side facing away from the tool receptacle. In other words, circumferentially arranged clamping segments 1 and their receptacles 2 form a receptacle annular groove 32 having an interrupted design.

Receptacles 2 are assigned securing device 30, which establish a connection between coupling ring 3 and clamping segments 1. Securing device 30 are provided to limit the axial mobility as well as to circumferentially fix the position of clamping segments 1 relative to coupling ring 3. Clamping elements 1 are preferably additionally supported on coupling ring 3 in a form-fitting manner.

In all specific embodiments of the segment collet according to the invention, coupling ring 3 is formed from securing sections 4 accommodated in receptacles 2 and from web sections 5 connecting securing sections 4 to each other.

Figure 1:
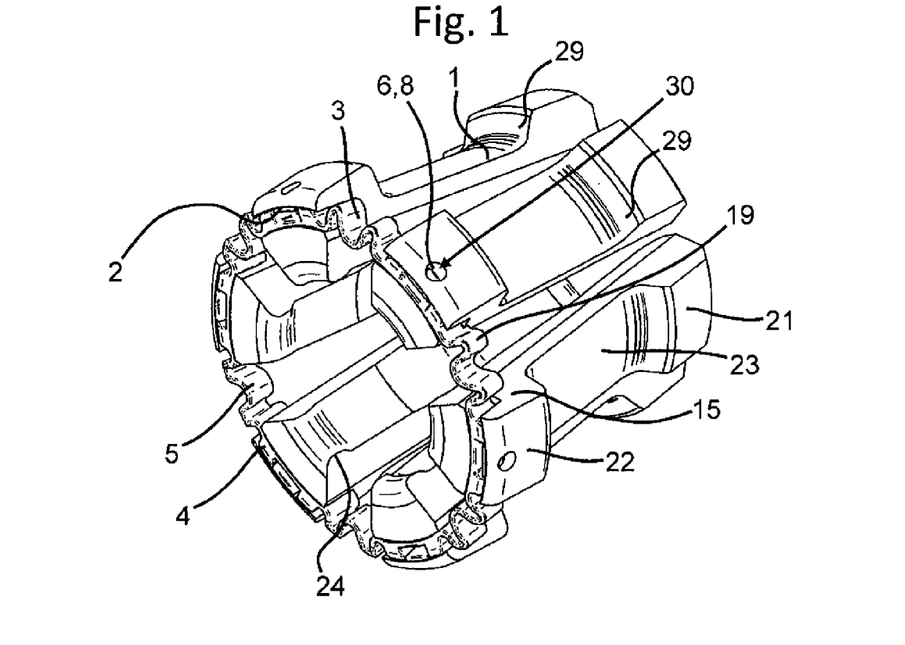
FIG. 1 shows a first specific embodiment of a segment collet.
Figure 2:
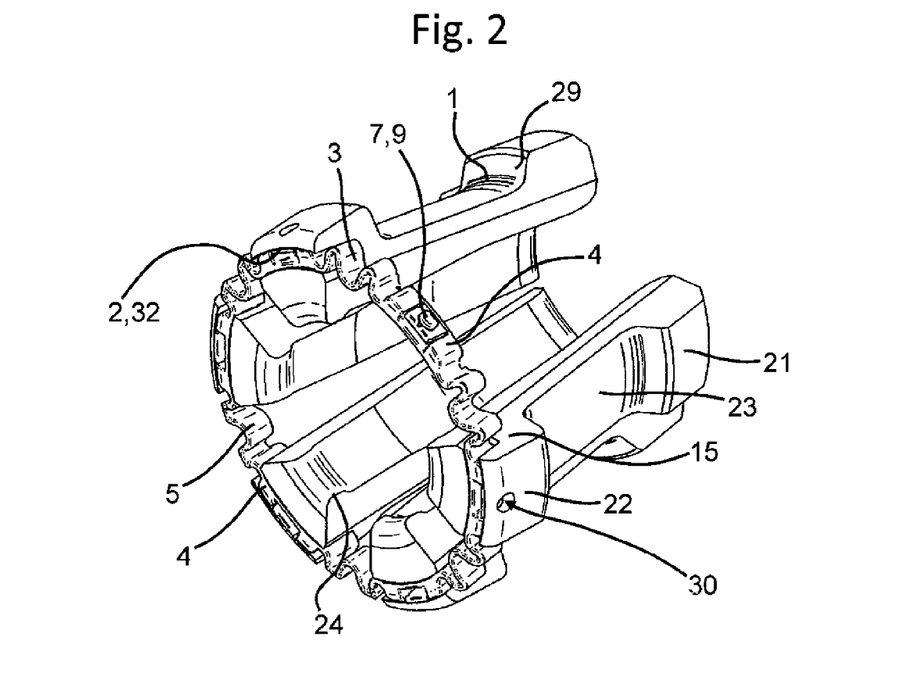
FIG. 2 shows the specific embodiment of a segment collet according to FIG. 1, including a removed clamping segment.
Figure 3:
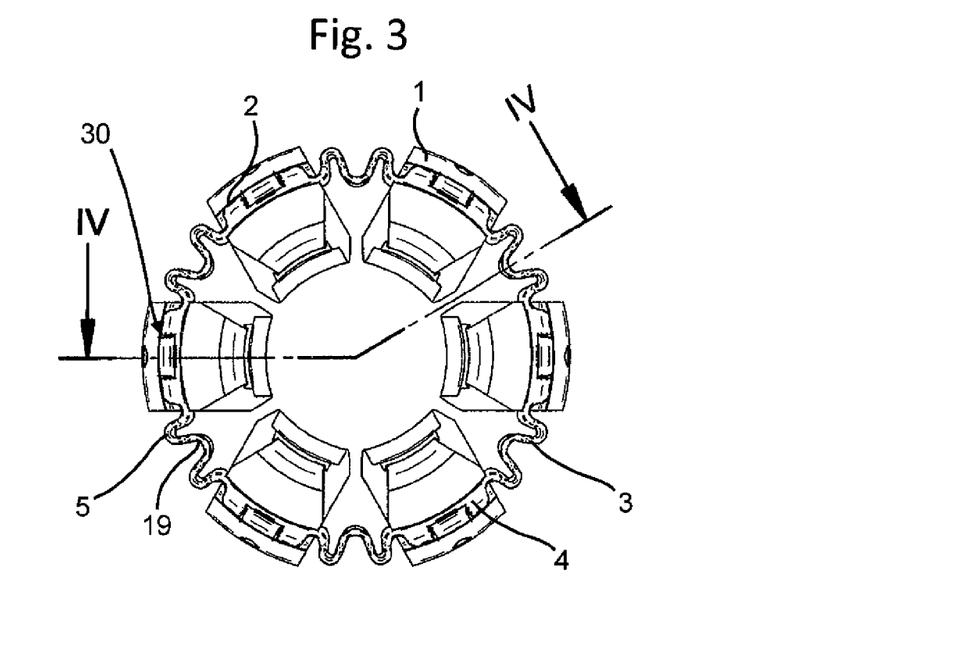
FIG. 3 shows a top view of the segment collet according to FIG. 1.
Figure 4:
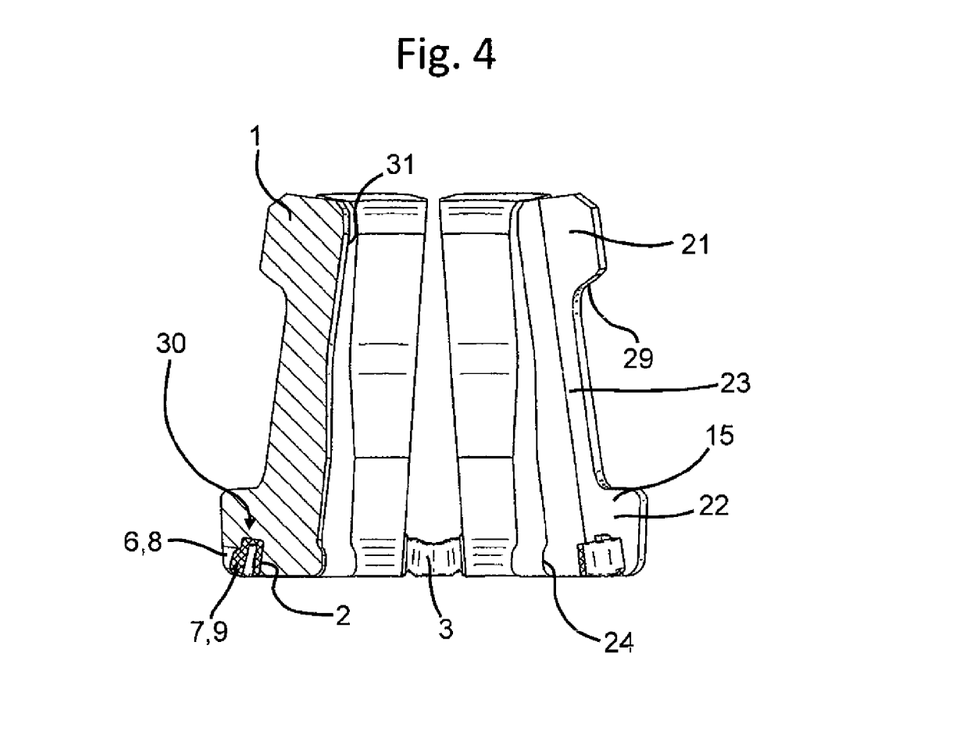
FIG. 4 shows section IV-IV from FIG. 3.
Figure 5:
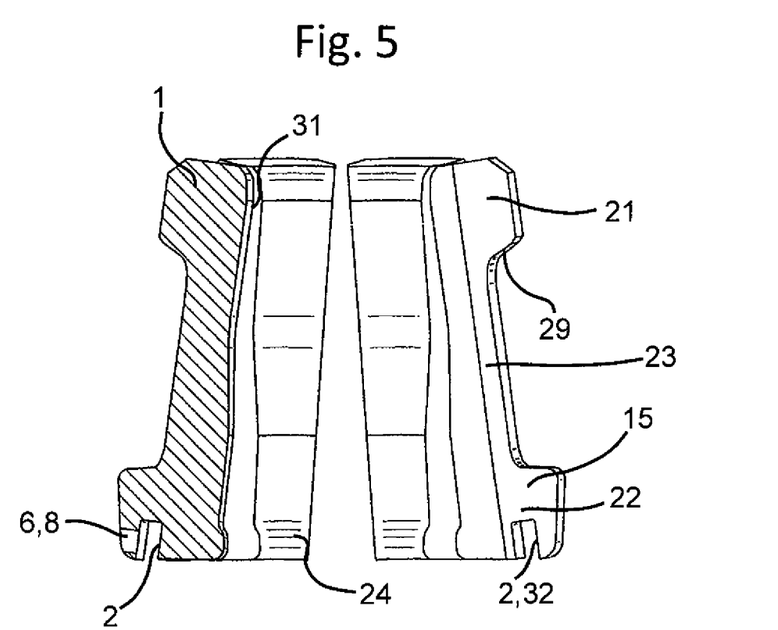
FIG. 5 shows a view corresponding to section IV-IV of a segment collet according to FIG. 1, without a coupling ring.
Figure 9:
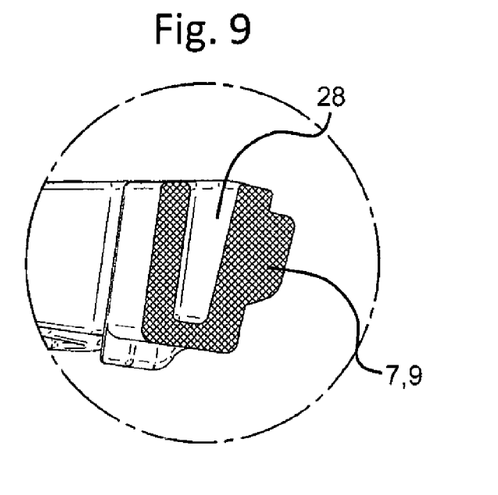
FIG. 9 shows detail A from FIG. 8.

In the segment collet according to FIG. 1, recess 6 designed as a latching receptacle 8 is oriented radially, in the present case radially on the outside. A securing element 7 designed as a latching element 9 is supported on securing sections 4 of coupling ring 3, this securing element also being radially oriented and preferably flexibly engaging with latching receptacle 8 of particular clamping segment 1. A flexibility is established by the fact that latching elements 9 are radially elastically deformable or have a radial, spring-mounted design. This enables them to engage with latching receptacles 8 of receptacles 2. The spring action of latching elements 9 is achieved by a cutaway section 28 or by corresponding cavities, into which particular latching element 9 is able to withdraw radially (see detail view in FIG. 9).

Figure 6:
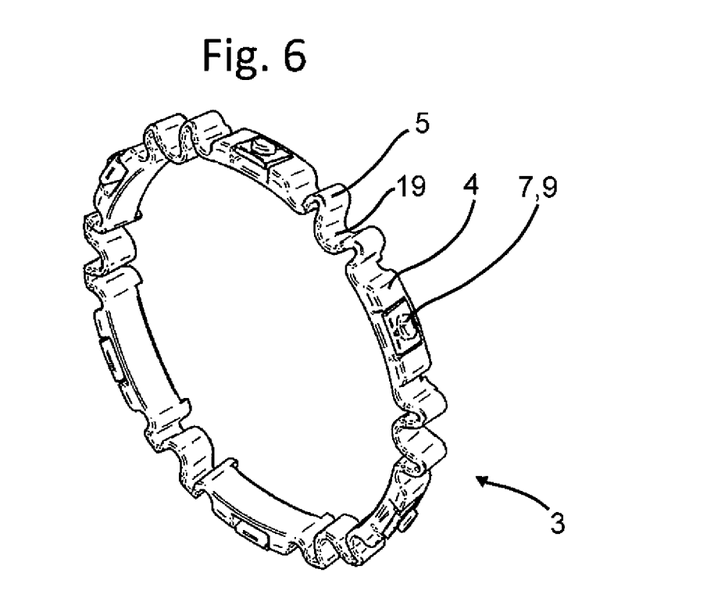
FIG. 6 shows a perspective view of the coupling ring of the segment collet according to FIG. 1.
Figure 7:
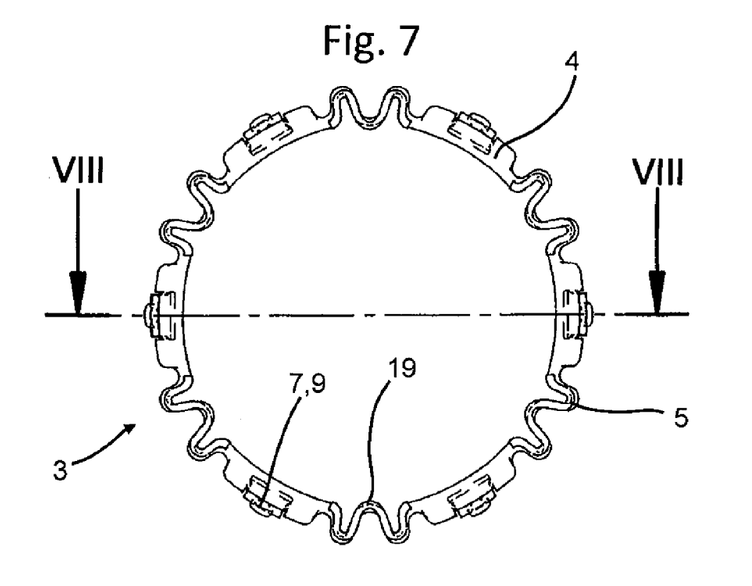
FIG. 7 shows a top view of the coupling ring of the segment collet according to FIG. 1.
Figure 8:
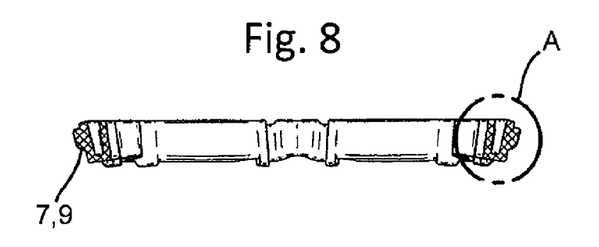
FIG. 8 shows section VIII-VIII from FIG. 7.

As is apparent, in particular, from the isolated representations of associated coupling ring 3 in this specific embodiment, securing sections 4 are connected to each other by web sections 5 to form a closed ring in the circumferential direction. Web sections 5 include a spring-mounted element 19, which has a wave shape in the illustrated specific embodiment. This wave shape furthermore maintains clamping segments 1 under a pretension with respect to each other, so that the segment collet is continuously pressed in the direction of an open position by its coupling ring 3.

Figure 10:
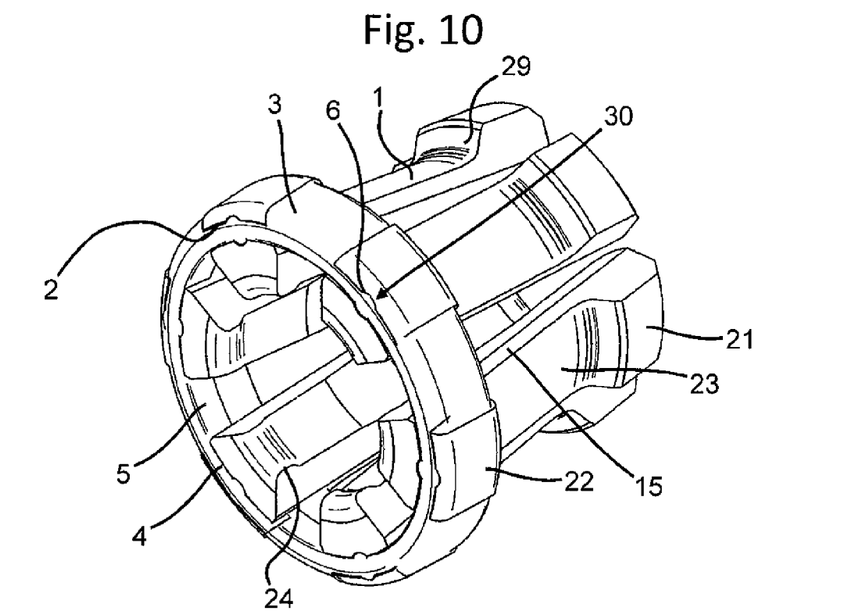
FIG. 10 shows a second specific embodiment of a segment collet.

In the segment collet according to FIG. 10, recesses 6 are formed in the axial direction on receptacles 2 of clamping segments 1. Securing elements 7 of coupling ring 3 enter these recesses 6. Recesses 6 are designed as bores to simplify manufacturing. In other words, axial bores, which form recesses 6 in individual receptacles 2, are added to receptacle annular groove 32 illustrated here. The axial extension of recesses 6 is greater than the axial extension of end-face receptacle annular groove 32 or end-face receptacles 2 of clamping segments 1. These bores accommodate securing element 7 of coupling ring 3, which is designed as a tab 16 and is supported on securing section 4 of coupling ring 3. The connection between clamping elements 1 and coupling ring 3 is established as follows: After a primer is applied, an adhesive is introduced into bores. Coupling ring 3 is then placed into receptacles 2 and its tabs 16 are placed in recesses 6. Due to the resulting integral fit—possibly supporting a force fit—coupling ring 3 is limited in its axial mobility relative to clamping segments 1, on the one hand, and clamping segments 1 are fixed in their position on the circumference of coupling ring 3, on the other hand.

Figure 11:
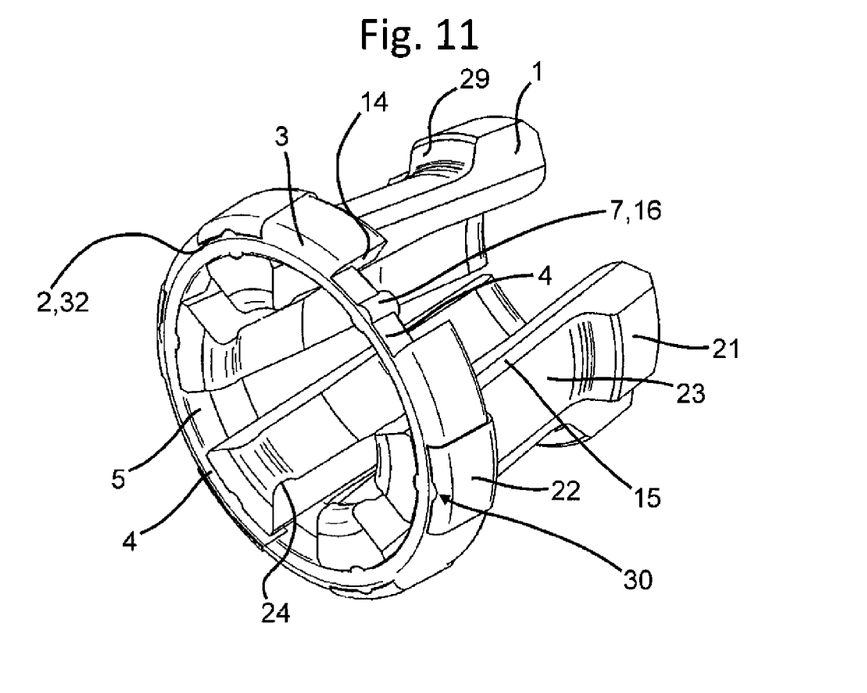
FIG. 11 shows the segment collet according to FIG. 10, including a removed clamping segment.
Figure 12:
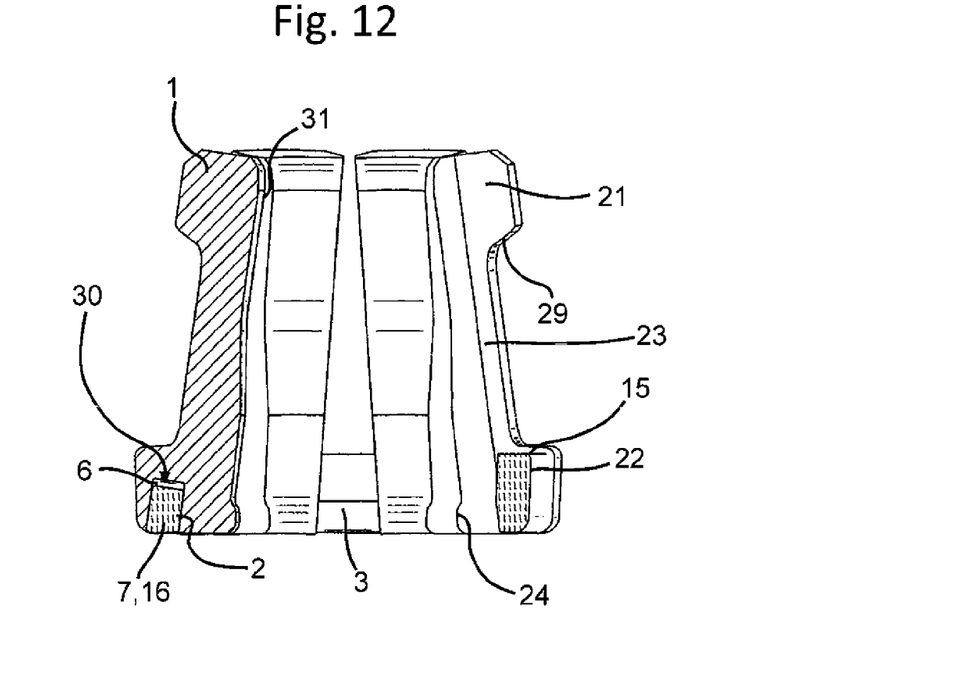
FIG. 12 shows a view corresponding to section IV-IV of the segment collet according to FIG. 10.
Figure 13:
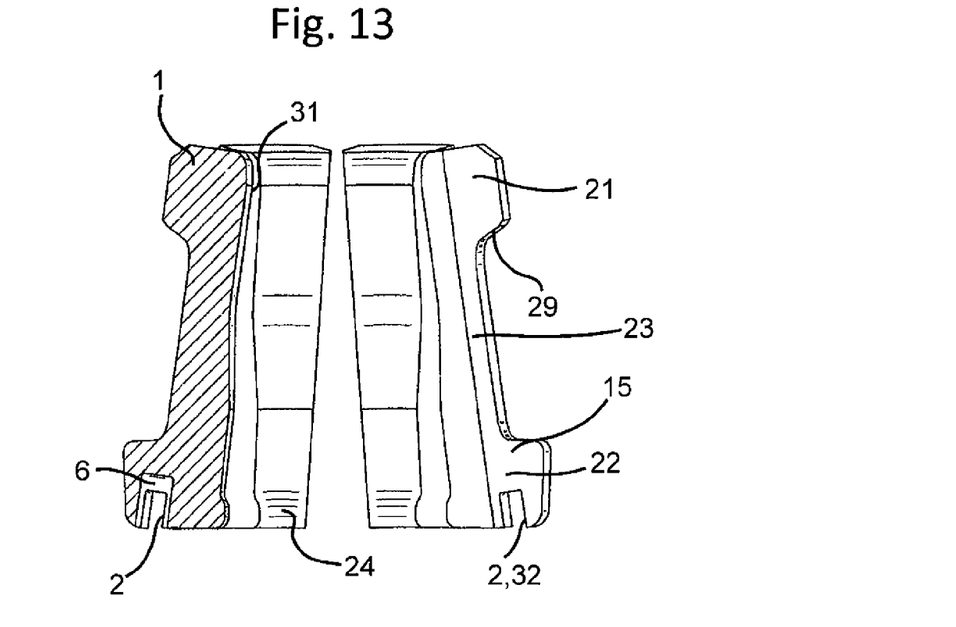
FIG. 13 shows a view corresponding to section IV-IV of a segment collet according to FIG. 10, without a coupling ring.
Figure 14:
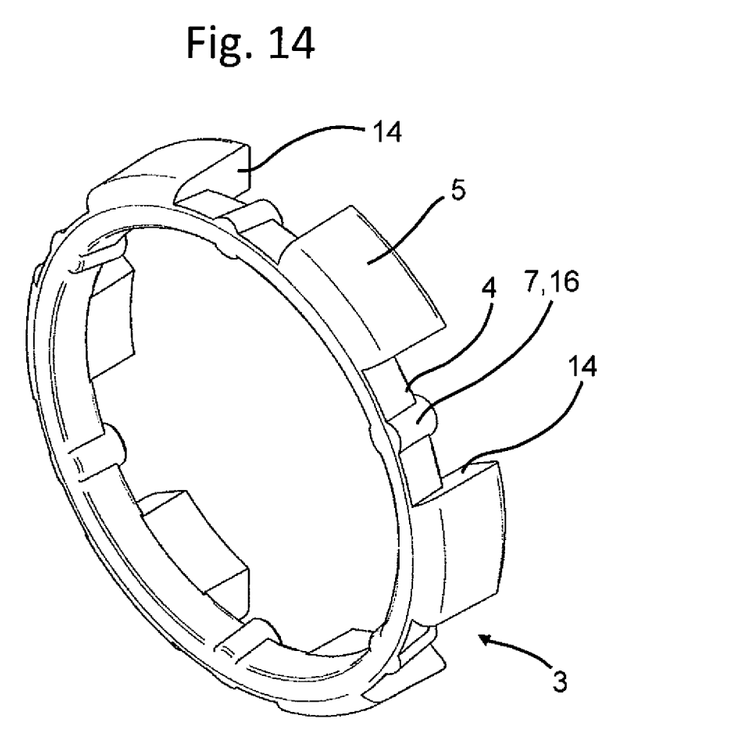
FIG. 14 shows the coupling ring of the segment collet according to FIG. 10.

In coupling ring 3 in this specific embodiment, the area of the cross section of securing section 4 is designed to be smaller than the area of the cross section of web section 5. As a result, a circumferentially smooth surface is formed with clamping segments 1. It is furthermore apparent from FIGS. 10 through 12 that coupling ring 3 and receptacles 2 are designed in such a way that coupling ring 3 does not project over the end face of clamping elements 1 but rather a smooth surface results here as well.

Each of web sections 5 additionally has a contact wall 14 on its two ends for contact with a flank 15 of clamping segments 1, whereby the circumferential position of clamping segments 1 is fixed relative to coupling ring 3. According to another specific embodiment, contact walls 14 of two adjacent web sections 5 are designed in such a way that clamping segments 1 located therebetween are supported on coupling ring 3 in a form-fitting manner. In addition, a pretension is preferably even applied to clamping segments 1 by adjacent contact walls 14.

Figure 15:
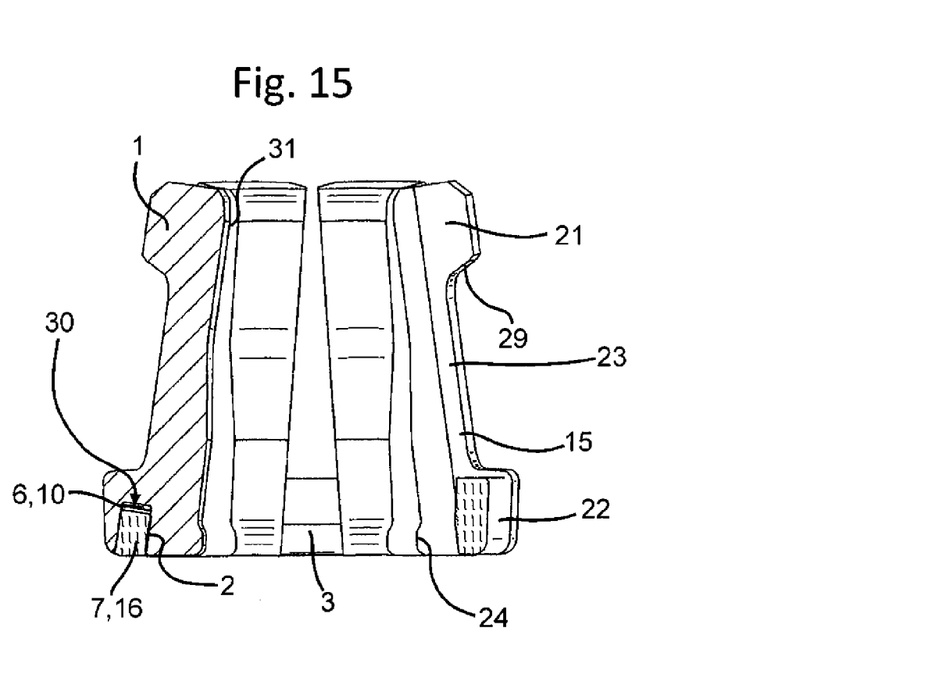
FIG. 15 shows a view corresponding to section IV-IV of a third specific embodiment of a segment collet.
Figure 16:
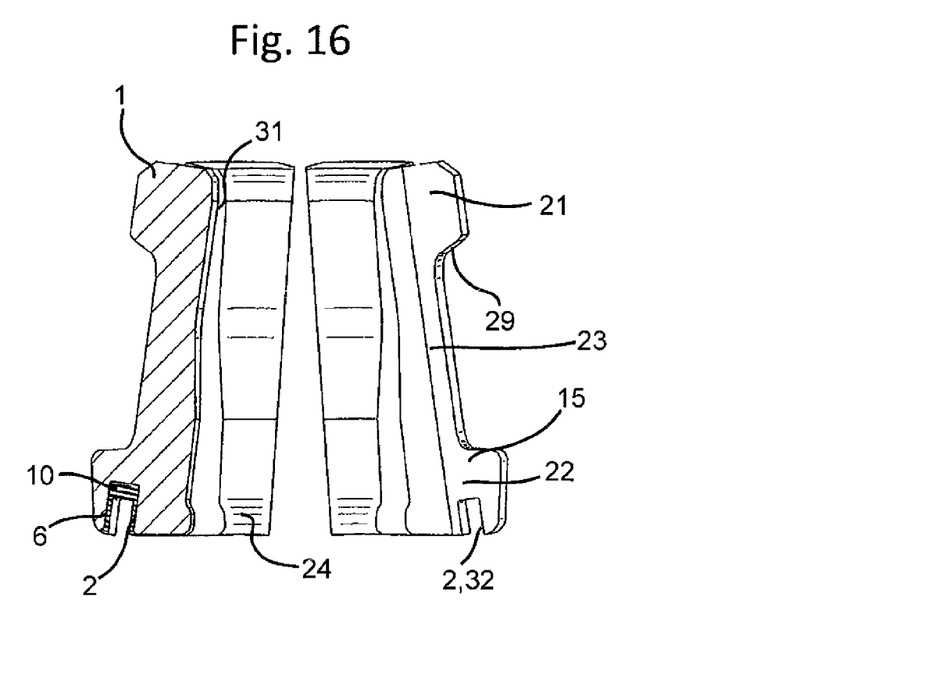
FIG. 16 shows a view corresponding to section IV-IV of a segment collet according to FIG. 15, without a coupling ring.

Coupling ring 3 used in the segment collet according to FIG. 10 may also be used in the segment collet according to FIG. 15. The segment collet according to FIG. 15 has recesses 6 in receptacles 2, whose diameter is designed to be smaller than the diameter of securing elements 7 or tabs 16. When coupling ring 3 is inserted into receptacles 2, in particular when tab 16 is inserted into recesses 6, a force fit occurs. Once again, an additional application of adhesive may be used to form not only a force fit but also an integral fit between recesses 6 and tab 16. In addition, the surface of recess 6 may be roughened, whereby it may be fixedly anchored in preferably compressibly formed tab 16. As is apparent, in particular, from FIG. 16, a thread cut 10 may be alternatively introduced into recess 2, so that the thread turns of thread cut 10 fix compressible tab 16 in recess 6. With regard to the further design of the segment collet according to FIG. 15, reference is hereby made to the explanations of the specific embodiment according to FIG. 10, since the segment collet according to FIG. 15 has many coinciding features therewith.

Figure 17:
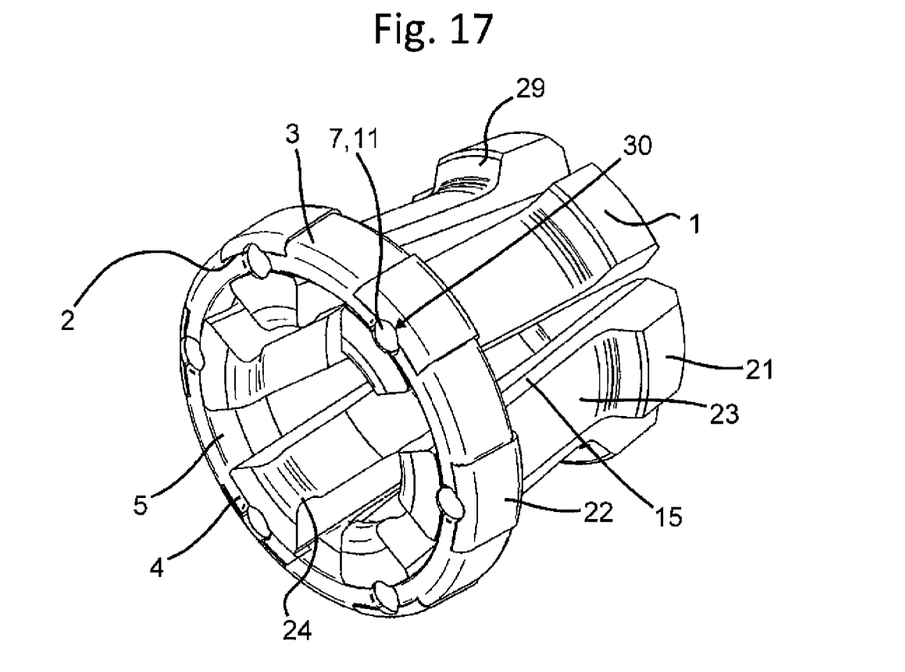
FIG. 17 shows a fourth specific embodiment of a segment collet.
Figure 18:
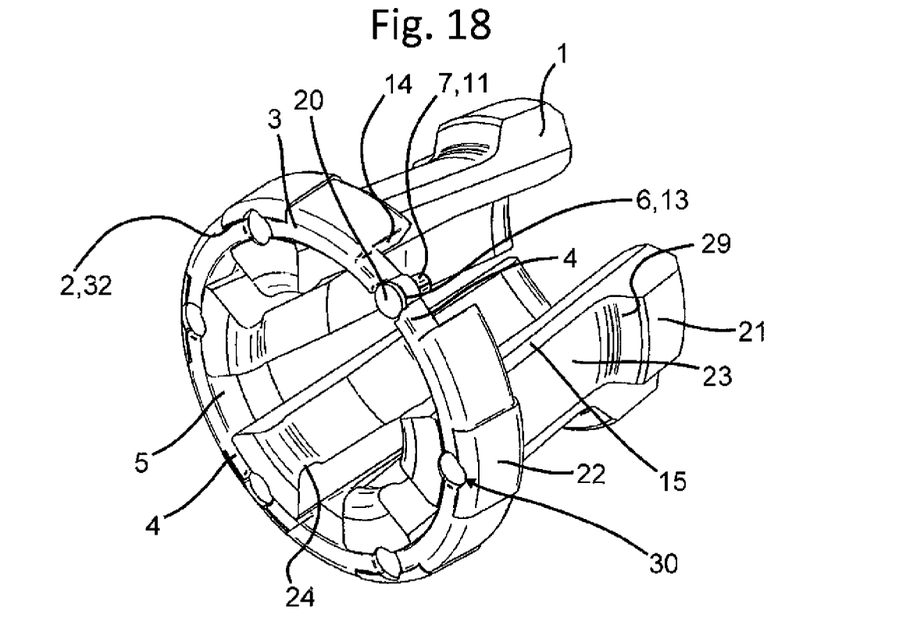
FIG. 18 shows the segment collet according to FIG. 17, including a removed clamping segment.
Figure 19:
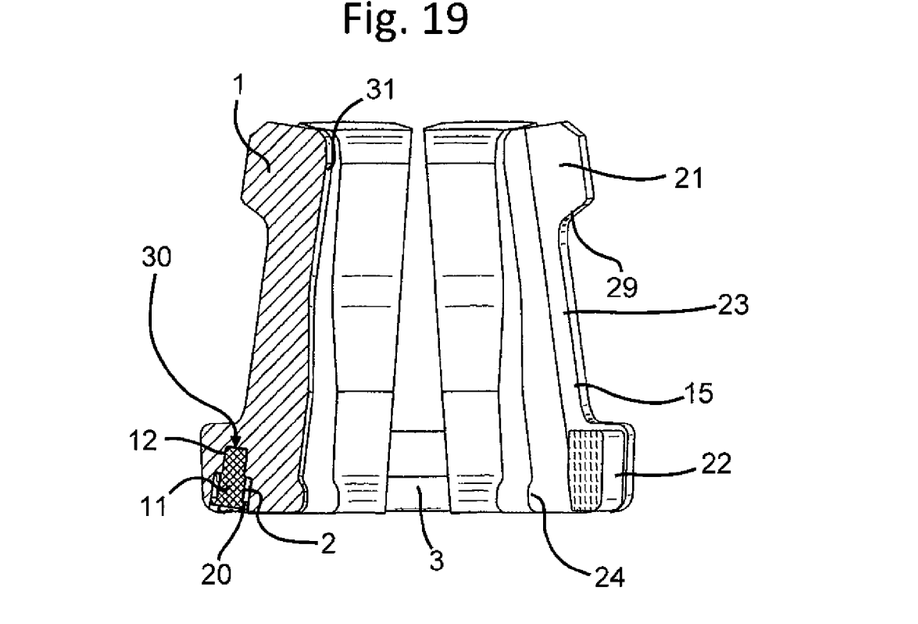
FIG. 19 shows a view corresponding to section IV-IV of the segment collet according to FIG. 17.
Figure 20:
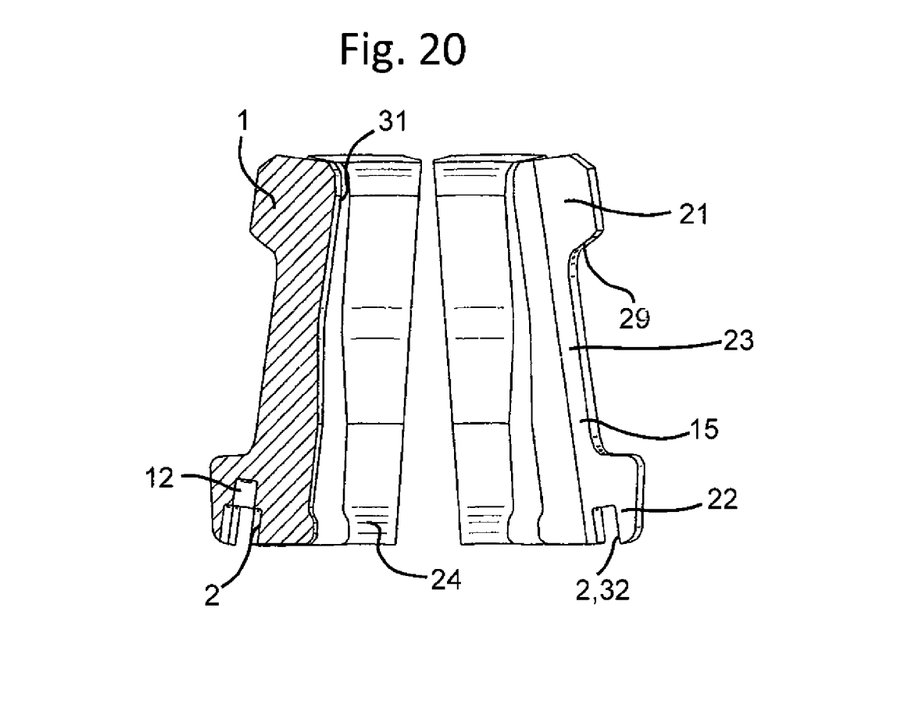
FIG. 20 shows a view corresponding to section IV-IV of the segment collet according to FIG. 17, without a coupling ring.
Figure 21:
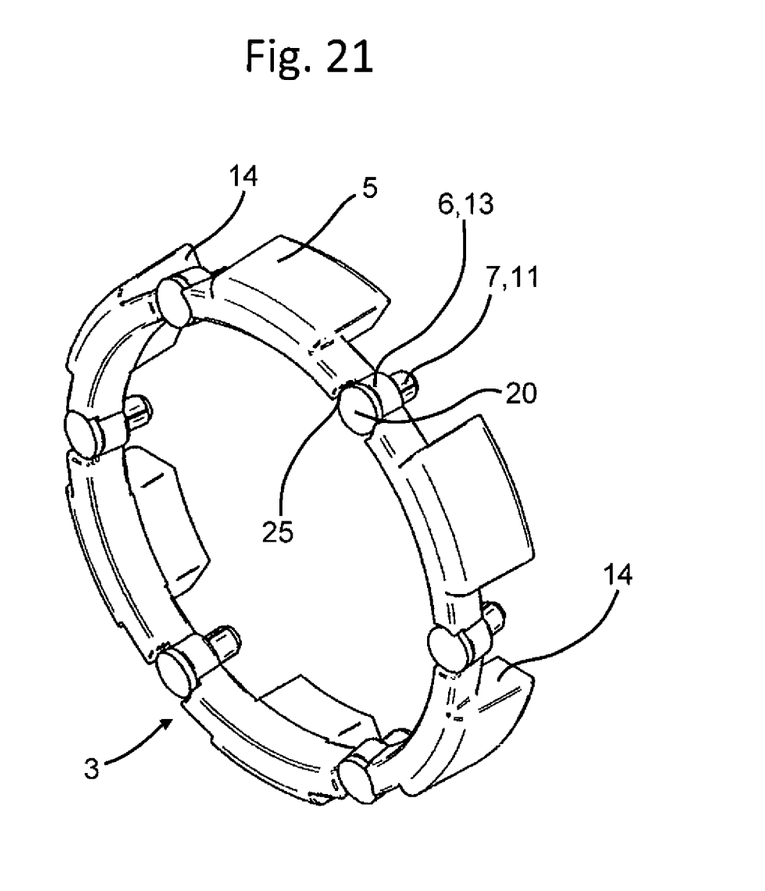
FIG. 21 shows the coupling ring of the segment collet according to FIG. 17.

In the segment collet according to FIG. 17, securing elements 7 are assigned to receptacles 2 of clamping segments 1. Securing elements 7 are designed as securing pins 11 having pin heads 20. These securing pins 11 are pressed into pockets 12 of receptacles 2 of clamping segments 1. To determine the axial position of coupling ring 3 with respect to clamping segments 1, or to limit the axial mobility of coupling ring 3 with respect to clamping elements 1, these securing pins 11 pass with play through recesses 6 designed as openings 13. A compression in the axial direction or an expansion of openings 13 in the radial direction does not occur, since securing pins 11 always form a clearance fit with openings 13 in coupling ring 3. Web sections 5 correspond to web sections 5 according to the specific embodiments in FIGS. 10 and 15, for which reason reference is hereby made to these previous embodiments.

A difference, however, is that securing section 4 has recess 6 designed as opening 13, which in this case is formed in the manner of an annular eye. Securing sections 4 furthermore have an indentation 25 in the area of this annular eye in such a way that pin head 20 terminates flush with the end face of clamping segments 1. This securing pin 11 is preferably designed as a rivet or a screw or a countersunk grooved pin and is pressed into pockets 12 of clamping segments 1 in such a way that a projection of pin head 20 with respect to securing section 4 of coupling ring 3 is present.

Figure 22:
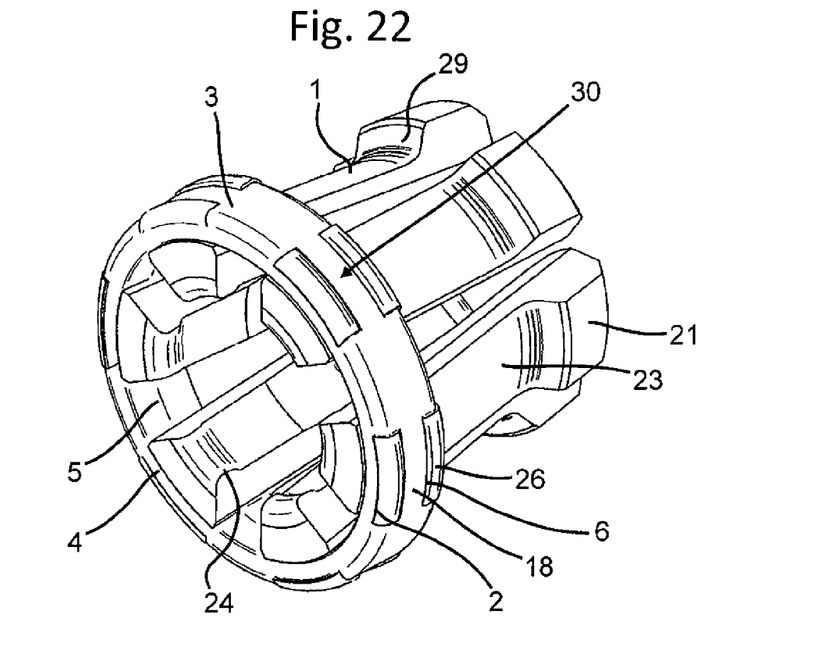
FIG. 22 shows a fifth specific embodiment of a segment collet.
Figure 23:
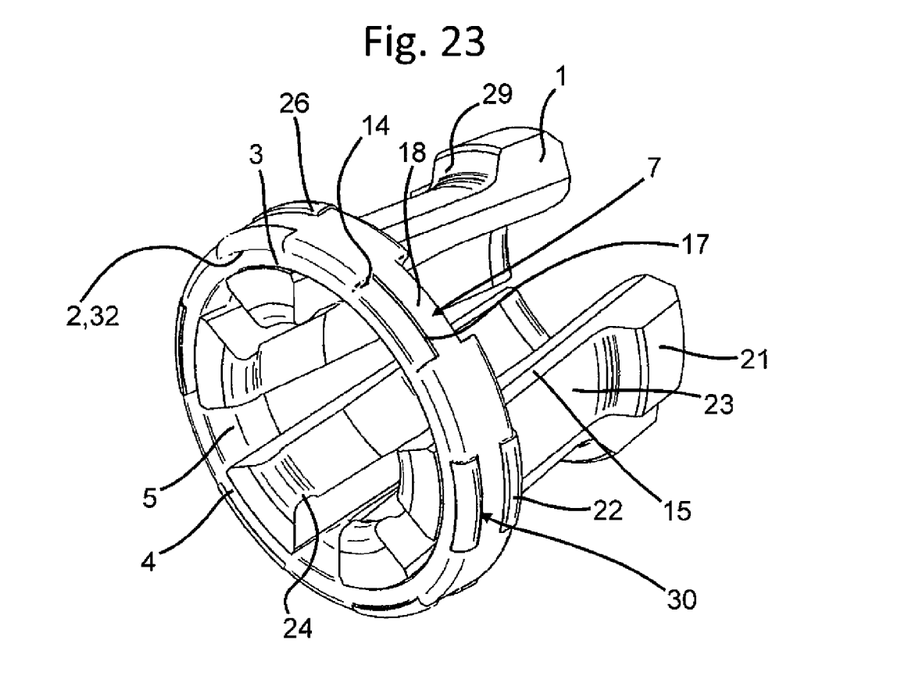
FIG. 23 shows the segment collet according to FIG. 22, including a removed clamping segment.
Figure 24:
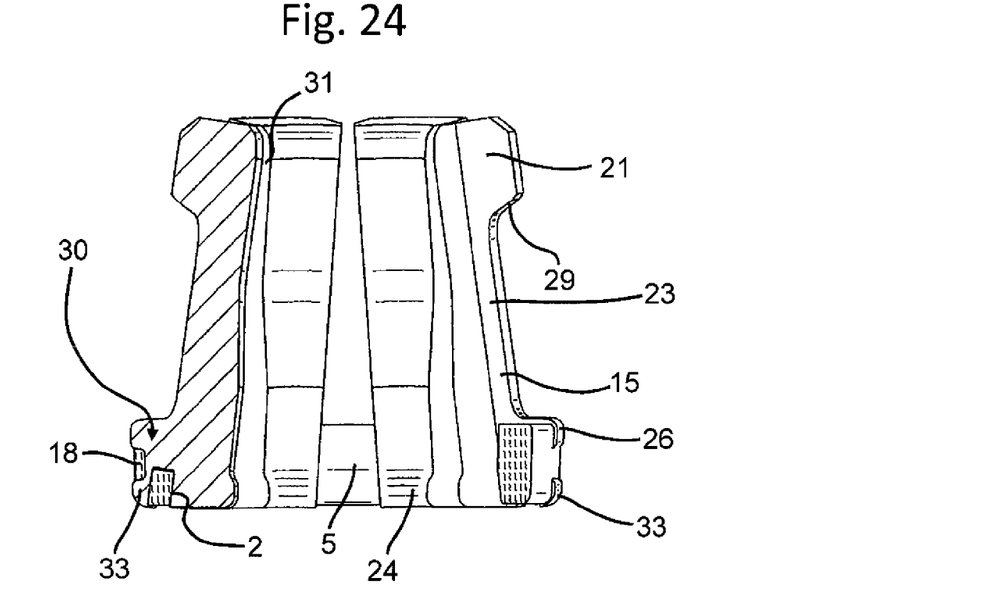
FIG. 24 shows a view corresponding to section IV-IV of the segment collet according to FIG. 22.
Figure 25:
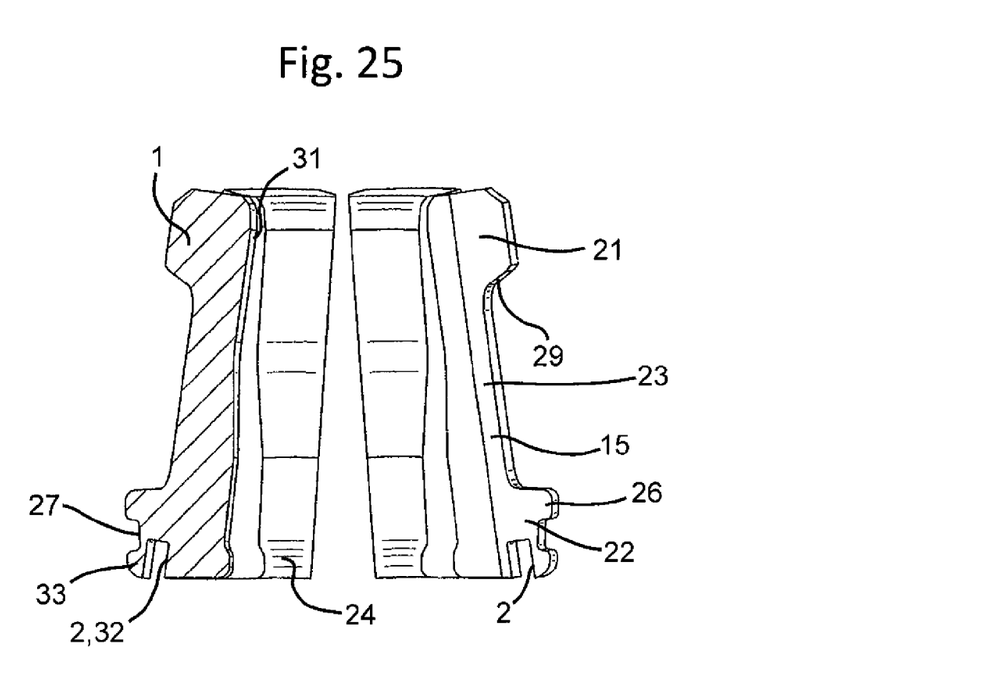
FIG. 25 shows a view corresponding to section IV-IV of the segment collet according to FIG. 22, without a coupling ring.
Figure 26:
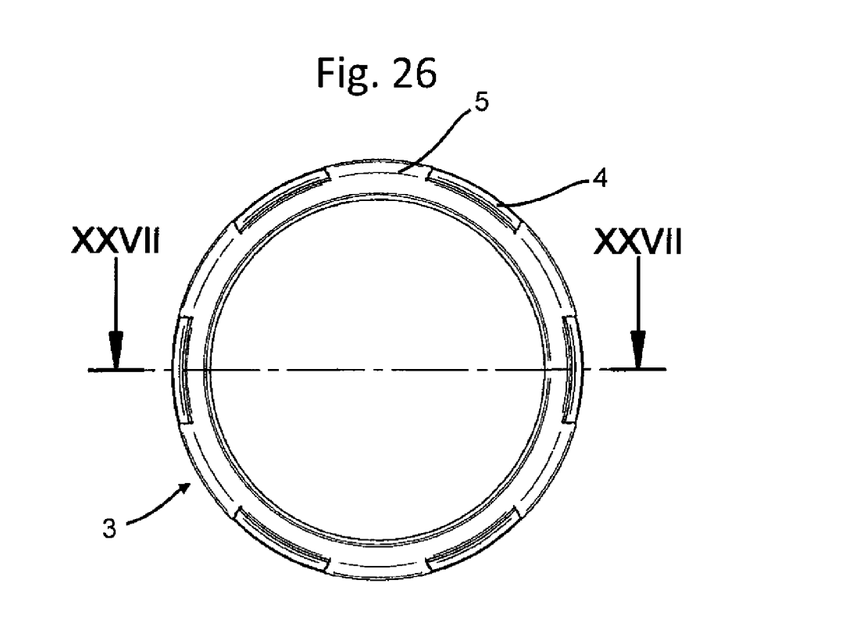
FIG. 26 shows a top view of the coupling ring of the segment collet according to FIG. 22.
Figure 27:
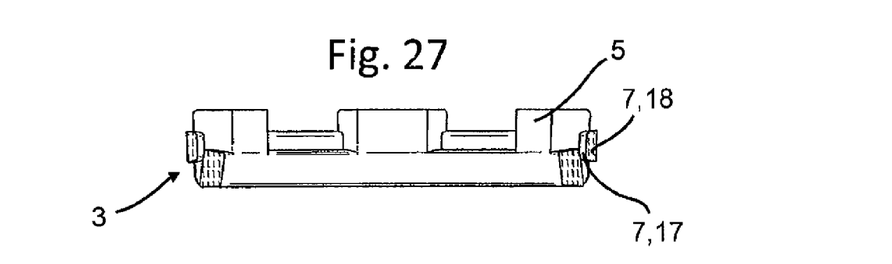
FIG. 27 shows section XXVII-XXVII from FIG. 26.
Figure 28:
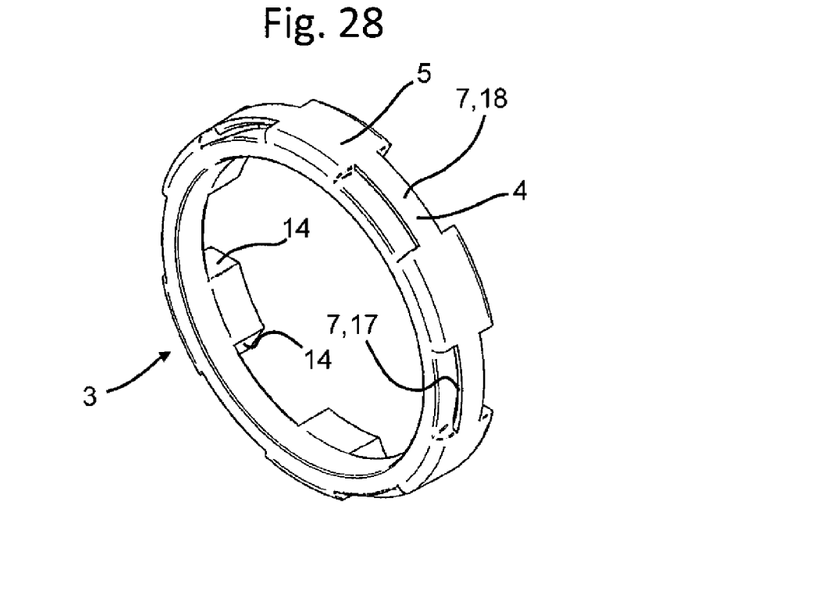
FIG. 28 shows a perspective view of the coupling ring of the segment collet according to FIG. 22.

The segment collet shown in FIG. 22 has a coupling ring 3, whose securing sections 4 include a securing element 7. Securing elements 7 have a securing recess 17 and a securing web 18. Clamping segments 1 are designed in such a way that recesses 2 formed on the end face have a section 33, which projects through securing recess 17 of coupling ring 3.

Coupling ring 3 furthermore has a securing web 18, which is acted upon radially, preferably in a form-fitting manner, by a securing arm 22 of clamping segments 1. Securing web 18 itself is supported in a radial recess 27, preferably in such a way that securing web 18 forms a smooth surface with segment feet 22. In this way, coupling ring 3 prevents an undesired detachment of individual clamping segments 1 from coupling ring 3. Moreover, the circumferential position of clamping segments 1 on coupling ring 3 is defined.

Special advantages of the segment collets according to the invention result from the more cost-effective manufacturability and by the ease of producing coupling rings 3 in a generative manufacturing method or by manufacturing them by injection molding.

Coupling ring 3 holds individual clamping elements 1 in their position via receptacles 2 and via securing device 30, so that the segment collets may also be used in horizontally arranged spindles (horizontal spindles). A restoring force is furthermore applied to clamping segments 1 of the segment collets in such a way that clamping segments 1 are pressed into a open position, the strength of the restoring force being predefinable by coupling ring 3.

For the sake of completeness, a method for manufacturing a segment collet according to the invention is described below. The method for manufacturing a segment collet is characterized by the following steps:

a) Forming at least two clamping segments 1 from metal or a metal alloy, including a segment head 21, a segment foot 22 and a segment body 23 in each case;

b) Refining clamping segments 1 by forming a receptacle 2, preferably on the end face of segment foot 22, and forming a recess 6 in receptacle 2, this work step b) preferably being implemented with work step a) in a joint work step;

c) Manufacturing a coupling ring 3 with a number of securing elements 7 corresponding to the number of clamping segments 1 and connecting adjacent securing sections 4 of coupling ring 3 with the aid of web sections 5 by using either a generative manufacturing method or an injection molding process;

d) Inserting securing section 4 of coupling ring 3 into receptacle 2 of clamping segments 1; and e) Fixing securing elements 7 of securing sections 4 in recesses 6 of receptacles 2 in such a way that the axial mobility of coupling ring 3 relative to clamping segments 1 is limited, and a position of clamping segments 1 relative to coupling ring 3 is fixed on the circumference.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A segment collet comprising:
   at least two clamping segments, each of the at least two clamping segments having a receptacle in which a coupling ring is accommodated, which connects the clamping segments to each other; and
   a securing device to connect the coupling ring to the clamping segments for limiting an axial mobility of the clamping segments relative to the coupling ring as well as to fix their circumferential position, wherein each clamping segment is composed of a segment body, a segment head being disposed on a first end of the clamping segment, and a segment foot being disposed on second end of the clamping segment opposite the first end, wherein the receptacle is formed in the segment foot, wherein the securing device is assigned to the receptacles and includes one of a groove or a raised section that extends in a radial direction of the segment collet, and wherein the coupling ring includes a securing section accommodated in the receptacles and having another one of the groove or the raised section that is formed on a circumferential surface of the coupling ring and that extends in the radial direction of the segment collet so as to engage with the one of the groove and the raised section of the securing device.

2. The segment collet according to claim 1, wherein the coupling ring includes web sections connecting the securing sections to each other.

3. The segment collet according to claim 2, wherein the web sections have a wave shape.

4. The segment collet according to claim 2, wherein the web sections have at least one contact wall for contact with a flank of the clamping segments.

5. The segment collet according to claim 4, wherein the clamping segments are supported on the coupling ring in a form-fitting manner by the contact walls of two adjacent web sections.

6. The segment collet according to claim 2, wherein the securing sections are additionally integrally secured in the receptacles of the clamping segments.

7. The segment collet according to claim 1, wherein the recess designed as a latching receptacle is oriented radially, and the securing element, also disposed in the radial direction and designed as a latching element, engages with the latching receptacle.

8. The segment collet according to claim 7, wherein the latching elements are assigned to the coupling ring and are radially elastically deformably supported on the securing sections.

9. The segment collet according to claim 1, wherein the recesses are formed on the receptacles of the clamping segments in the axial direction, and the securing elements are disposed on the securing sections of the coupling ring.

10. The segment collet according to claim 9, wherein the recesses are designed with a smaller diameter than the diameter of the securing elements.

11. The segment collet according to claim 9, wherein at least one of the recesses has a roughened surface and/or a thread cut, and the securing elements of the coupling ring are pressed into the recesses.

12. The segment collet according to claim 1, wherein the securing elements are assigned to the receptacles of the clamping segments, the securing elements are designed as securing pins, which are pressed into pockets formed in the receptacles of the clamping segments, and the recesses designed as openings with play for the securing pins are formed on the securing sections of the coupling ring.

13. A coupling ring for a segment collet according to claim 1, wherein the securing sections are disposed in alternating order, web sections interconnecting the securing sections are provided, and the securing element is assigned to the securing sections for limiting the axial mobility of clamping segments and to fix their position circumferentially on the coupling ring.

14. The coupling ring according to claim 13, wherein the web sections and/or the securing sections are formed from an elastomer or from a plastic.

15. The coupling ring according to claim 13, wherein the securing element is disposed on the securing section radially or perpendicularly to the circumferential direction.

16. The coupling ring according to claim 15, wherein the securing element is formed from a spring-mounted latching element or from a compressible tab or includes a securing recess and a securing web.

17. The coupling ring according to claim 13, wherein the web section includes a spring-mounted element.

18. The coupling ring according to claim 17, wherein the spring-mounted element has a wave shape.

19. The coupling ring according to claim 13, wherein the area of the cross section of the securing section is designed to be smaller than the area of the cross section of the web section.

20. The coupling ring according to claim 13, wherein the securing section has an axial opening for the passage with play of a securing element.

* * * * *